United States Patent [19]

Hanssen et al.

[11] 4,452,326
[45] Jun. 5, 1984

[54] CORNER BEARING ASSEMBLY FOR PLATFORM SCALE

[75] Inventors: Stan B. Hanssen, Las Cruces, N. Mex.; James R. Hanssen, Sligo, Ireland

[73] Assignee: Tricolor Corporation, Las Cruces, N. Mex.

[21] Appl. No.: 402,054

[22] Filed: Jul. 26, 1982

[51] Int. Cl.³ ...................... G01G 21/02; G01G 21/08
[52] U.S. Cl. .............................. 177/256; 177/DIG. 9
[58] Field of Search ........................ 177/256, DIG. 9; 308/2 R; 403/353

[56] References Cited

U.S. PATENT DOCUMENTS

| 2,646,271 | 7/1953 | Williams | 177/256 |
| 2,766,038 | 10/1956 | Weber | |
| 3,134,451 | 12/1964 | Hanssen | |
| 3,302,430 | 2/1967 | Maursey | 403/353 |
| 3,666,031 | 5/1972 | Provi et al. | 177/256 |

FOREIGN PATENT DOCUMENTS

| 2302832 | 9/1973 | Fed. Rep. of Germany | 177/256 |
| 2364293 | 6/1975 | Fed. Rep. of Germany | 177/DIG. 9 |

Primary Examiner—E. A. Goldberg
Assistant Examiner—Patrick W. Foster
Attorney, Agent, or Firm—Wood, Dalton, Phillips, Mason & Rowe

[57] ABSTRACT

A corner bearing assembly for a platform scale of the bathroom variety in which a formed sheet metal bearing has a knife edge to rest on a scale lever and a point or line contact with the cover platform with looseness sufficient to allow the bearing assembly to pivot enough during use to retain proper contact with both cover and scale levers. The bearing assembly is provided with a hanger connection to the cover capable of hand-assembly into a loose generally proper position so that upon physical assembly of the cover onto the base the bearing assemblies in all four corners of the scale automatically seat themselves properly both as to the cover and the scale levers.

9 Claims, 10 Drawing Figures

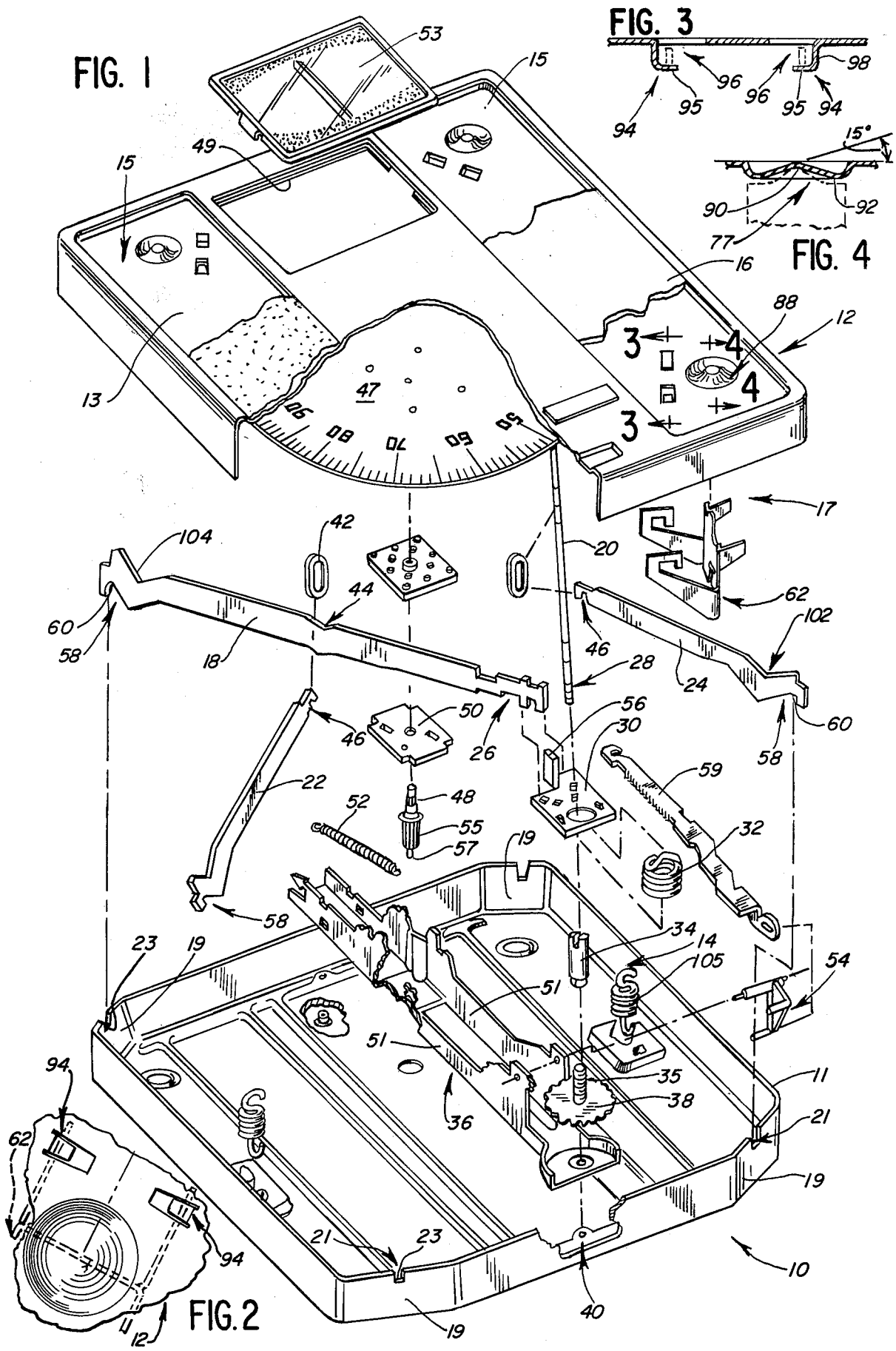

4,452,326

CORNER BEARING ASSEMBLY FOR PLATFORM SCALE

BACKGROUND OF THE INVENTION

1. Field of the Invention

This invention relates to platform-type scales and more particularly to a bearing assembly at the corners of the upper platform.

2. Description of the Background Art

Commonly, platform-type scales incorporate a lever system operatively engaged with an internal weight-sensing mechanism. A weight is applied to an upper platform which, through an intermediate corner bearing assembly, effects pivoting of the levers, and, in turn, actuates the sensing mechanism from which a weight can be determined.

Heretofore, the corner bearing has generally consisted of a bracket that is secured to the underside of the platform as by fasteners or welding. A hanger plate with a knife edge is pivotally suspended by the bracket or is otherwise captured between the platform and base so as to align and engage the knife edges on the hanger and lever.

Generally, the bearing assembly, to include the bracket and hanger plate, is relatively expensive to manufacture and complicated to install. For example, a downwardly opening U-shaped bracket is commonly used and pivotally mounts the hanger between the legs of the U. The bracket and hanger plate must be constructed separately. Further separate operations are required to assemble the hanger plate within the bracket and the bracket with the platform.

The present invention is directed to overcoming the prior problems enumerated above.

SUMMARY OF THE INVENTION

The invention comprises an improved bearing assembly at the corners of a platform-type scale. A bearing member is floatingly retained on the underside of the weighing platform immediately above a counterbalanced lever upon which the member bears in transmitting the force applied through the platform. The levers actuate a weight-sensing mechanism through a conventional assembly. A downwardly facing, tapered dimple is defined integrally with the platform adjacent each corner thereof. The bearing member, which is captured between the platform and lever, has a rounded nose which is disposed within the dimple for pivotable movement, and a downwardly facing knife edge which seats upon the upper surface of the lever. The nose is guided by the taper to consistently seek alignment at the apex of the dimple.

It is the principal object of the invention to provide a corner bearing assembly with a simplified bearing member and structure through which assembly of the bearing member and platform can be accomplished.

In a preferred form of the invention, a plurality of spaced lugs are struck from or otherwise formed beneath the platform. The bearing member has a plurality of integrally formed arms which are captured in openings between the lugs and the underside of the platform in a manner that no tools or fasteners are required for assembly.

To accomplish this, the lugs depend from the platform in an L-shape and open towards each other. The arms are of a dimension to fit loosely within the opening defined by the lugs so that floating movement of the nose within the dimple is accommodated. The bearing member is assembled by tilting the same and inserting an arm in one of the openings as far as is permitted by the lug. With the arm fully seated, the free arm clears the other lug and can be inserted in the opposite opening. In the event the other lug interferes with the free arm, the arm can be deformed sufficiently to provide clearance. Once the arm reassumes its original position, escape of the bearing member from the platform is prohibited, even should the member be tilted. The ends of the arms are hook-shaped to prevent escape from the lugs lengthwise of the arms.

To afford stability to the bearing member, at least one tab is constructed with the bearing member and extends parallel to the arms. The tab abuts the underside of the platform when the bearing member is tilted.

Pivoting is also confined by a pair of upwardly facing edges extending away from the rounded nose of the bearing member. An annular depression defines the dimple and an annular lower edge thereabout. The edges span the radius of the annular edge and selectively abut the edge with the bearing member tilted to either side.

It is an additional object of the invention to provide a bearing member that can be simply stamped from a flat sheet. The arms and tabs are formed by folding portions of a blank relative to a main body that includes the rounded head and knife edge.

BRIEF DESCRIPTION OF THE DRAWINGS

FIG. 1 is an exploded perspective view of a platform-type scale incorporating a preferred form of the corner bearing assembly, to include a bearing plate and associated mounting structure at the underside of the platform;

FIG. 2 is a fragmentary plan view of the mounting structure for the bearing plate at the underside of the platform with the assembled bearing plate illustrated in phantom;

FIG. 3 is a fragmentary sectional view of the plate mounting structure along line 3—3 of FIG. 1;

FIG. 4 is a fragmentary sectional view of the plate mounting structure along line 4—4 of FIG. 1;

DETAILED DESCRIPTION OF THE DRAWING

Figure 5:
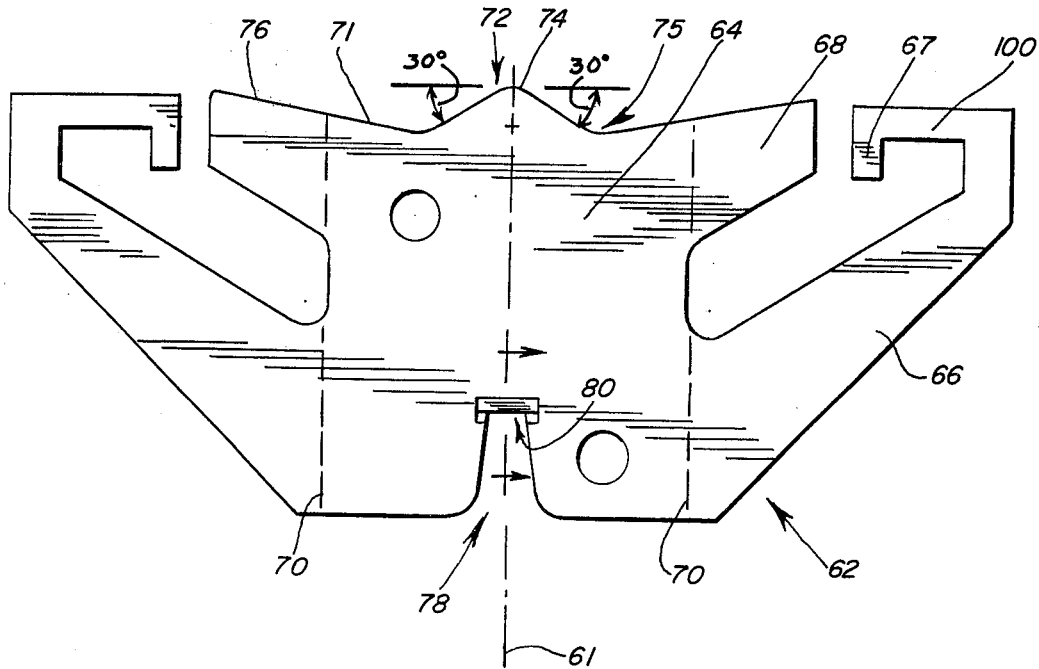
FIG. 5 is an enlarged, elevation view of a stamped blank used to form the corner bearing plate of FIG. 1.
Figure 6:
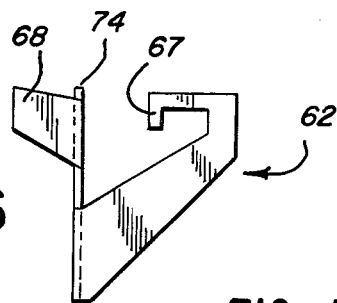
FIG. 6 is a side elevation view of the corner plate.
Figure 7:
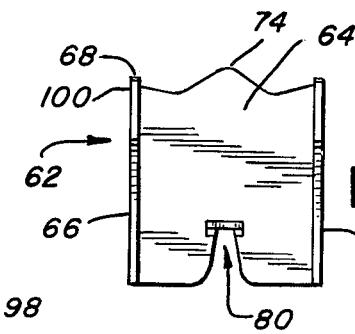
FIG. 7 is a front elevation view of the bearing plate.
Figure 10:
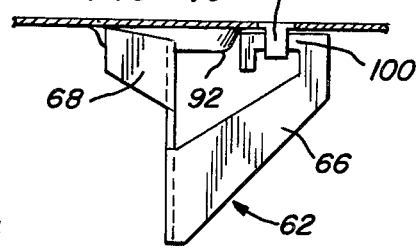
FIG. 10 is a fragmentary elevation view of the bearing member suspended from the platform.
Figure 8:
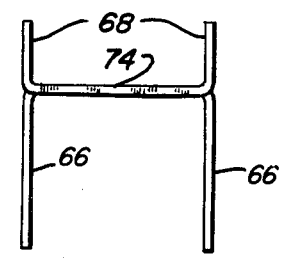
FIG. 8 is an enlarged, fragmentary sectional view of a knife edge defined on the bearing plate taken along line 8—8 of FIG. 5.

An exemplary scale construction incorporating a preferred form of the invention, is illustrated in FIG. 1, to include generally a substantially rectangular base 10 with an upwardly facing peripheral rim 11, an interfitting cover member 12, and internal weight-sensing mechanism indicated generally at 14. The cover 12 has a platform 13 with spaced rectangular recesses 15 having disposed thereover a material 16 with a roughened texture to prevent the user's feet from slipping. The sensing mechanism 14, exclusive of the bearing assembly 17 at the corners, is conventional and described briefly in the following paragraphs.

The mechanism 14 coacts with four overlapping stamped levers 18,20,22,24, extending from and pivotable at the four corners of the rim 11. Each of the four corners has an angled wall portion 19 with an upwardly opening notch 21 defining a knife edge 23 upon which the levers 18,20,22,24 pivot. The longer levers 18,20 extend diagonally from the front walls 19 in a V-configuration, with the rear ends 26,28 rigidly secured to a nose plate 30, suspended from a calibrating coil spring 32. The nose plate 30 is substantially horizontally disposed and extends between the vertically spaced turns of the spring 32. The coil spring 32 surrounds and is suspended from the top of an upright slotted post 34. The post 34 is threaded internally at its lower end over a portion of a support rod 35 upon the base 10 so that the calibrating spring 32 and associated lever mechanism may be raised and lowered in the base pan, thus moving the dial through its mechanism to a position that it will indicate "0" pounds being weighed without any weight applied to the platform 13. The lower end of the rod abuts a metal channel 36 and is manipulable through a thumb nut 38 protruding from an opening 40 in the rear portion of the base 10. The channel is secured to the base 10 as by rivets or the like.

The short levers 22,24 extend from the rear corner walls 19 in overlapping relationship with the long levers 18,20 at an intermediate position thereon. A closed hanger ring 42 surrounds the long and short levers at their point of intersection. The longer levers 18,20 overlie the shorter levers 22,24 and have an upwardly opening V-shaped notch 44 within which the upper part of ring 42 is retained. A downwardly opening notch 46 on the short levers 22,24 accommodates the lower portion of the ring 42. This arrangement permits a degree of relative lateral shifting between the short levers 22,24 and long levers 18,20, however maintains the same in working relationship.

A disc-shaped dial 47 is mounted for rotation with an upright splined shaft 48 and rests upon a horizontal plate 50 spanning the sides 51 of and secured to the channel 36. The dial is visible through a rectangular opening 49 in the platform 13 having fit therewithin a transparent window 53. A pinion gear 55 extends from the lower portion of shaft 48, beneath the plate 50, and has a downwardly projecting stud 57 which seats on the bottom of the channel 36. The pinion gear 55 engages a rack 59 which is movable forwardly and rearwardly relative to the base 10. The rack is urged toward the front of the base by a tensioned coil spring 52. A bell crank lever 54 transmits the motion of the longer levers 18,20 to the rack. The upper portion of the bell crank lever 54 is captured and pivotally mounted between the sides 51 of the channel 36. The bottom portion of the lever 54 is pivotally connected with the rack 59, which is tensioned forwardly to effect a clockwise torque on the lever 54 in FIG. 2. An upright tab 56 on the nose plate 30 abuts the rearward portion of the lever 54 and restrains pivoting. When a weight is applied to the scale, the plate 30 is depressed by the long levers 18,20, allowing pivoting of the bell crank lever 54 which, in turn, moves the rack 59 toward the front, rotating the shaft 48 and engaging dial 47 such that the weight is presented at the window 53.

The construction of the corner bearing assembly 17 is wherein the invention resides. The bearing assembly floats the cover 12 above the base 10. Specifically, when a weight is applied to the platform 13, a force is transmitted through each bearing assembly 17 to the levers 18,20,22,24 adjacent the four corners of the base 10. The illustrated levers 18, 20,22,24, which are preferably stamped from a sheet metal plate, each have a downwardly opening notch 58 defining a knife edge 60 which overlies and seats against and transversely to the knife edge 23 on the base 10. Under a sufficient force, the levers pivot on the rim 11 such that the nose plate 30 is depressed as previously described.

Between each lever 18,20,22,24 and the platform 13 is disposed a bearing plate 62, the details of which are shown in FIGS. 5-9. An exemplary corner, the right rear in FIG. 1, is used throughout the remainder of the description to describe the bearing assembly 17, keeping in mind that the remainder of the corners are similarly arranged.

Each bearing plate 62 is retained floatingly on the underside of the cover 12. Each plate 62 is stamped from sheet metal and is symmetrical about a vertical line 61, shown in FIG. 5. The plate blanks have a substantially rectangular body 64 and hooked arms 66 with free ends 67 extending laterally and oppositely from the body 64. A pair of tabs 68 extend laterally from the body 64 at a point above from where the arms 66 originate.

Two fold lines 70 are indicated at opposing edges of the body and are substantially parallel to the center axis 61. The hook-shaped arms 66 are folded about the lines 70 in a common direction so as to form a right angle with body 64. The tabs 68 are folded oppositely to the arms 66 and likewise perpendicular to the body so as to reside substantially in the plane of the arms 66 as shown clearly in FIG. 8.

The details of the body 64 are shown most clearly in FIG. 5. The upper edge 71 of the body is configured to approximate the shape of an expanded W and defines curved, upwardly facing regions 75 adjacent and on opposite sides of the centerline 61. The edge 71 extends symmetrically downward from the apex 74 at either side of the centerline, making approximately an angle of 30° with the horizontal. The upper edge 76 of the tabs 68 is sloped at approximately 25° to horizontal. The center of the body at the upper edge 71 has a curved profile and defines a rounded bearing nose 72.

Figure 9:
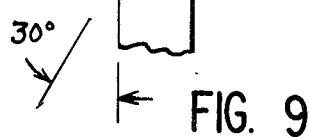
FIG. 9 is a top plan view of the bearing plate.

Centrally of and adjacent the lower region of the body 64 is a downwardly opening U-shaped notch 78. The lower edge 80 of the body 64 defining the notch 78 is tapered, as shown in FIG. 9, to define a knife edge 82. The tapered converging walls 84 of the body 64 preferably make an angle of approximately 60° with each other.

The details of the platform structure at 86 that accommodate the bearing plate 62 are shown in FIGS. 1-4. The platform 12 is depressed at each of four corners defining annular curved recesses 88. As shown in FIG. 4, the circular depression or recess formed in the metal of the scale cover provides a central, downwardly facing, tapered dimple 77. The walls of the dimple 77 extend away from the apex 90 at an angle of about 15° to horizontal. It may be remembered that the nose 72 on plate 62 which is fit into the dimple in the cover has edges at about 30° to horizontal so that the plate point can fit into the apex 90 of the dimple 77 with substantially close to point contact. This point contact will act as a knife shape ensuring that weight is transferred from cover to plate at a definite point each time a person steps on the scale. Since the upper edges 76 of the plate 62 away from the nose 72 do not contact the underside of the platform, the weight will be transferred directly upon the centerline of the plate 62 through the point 74. The upper edges 76 of the tabs 68 selectively abut the lower annular edge 92 of the recess 88 to prevent excessive tilting of the plate in the plane of the body.

Depending from the platform and located interiorly of the annular depression are a pair of spaced lugs 94, which, with the cover fabricated from metal, can be struck directly from the platform. The lugs illustrated in FIGS. 1–3 are substantially L-shaped with oppositely bent legs 95 forming a pair of openings 96 facing diagonally of the cover 12 and substantially parallel to the levers 18,20,22,24. The lugs 94 might be configured alternatively in the shape of a V or J.

To assemble the bearing plate 62, the bearing nose 72 of plate 62 is seated in the dimple 77 on the platform. The plate 62 is tilted downwardly at one side and one of the hook-shaped arms 66 moved laterally to be seated between the lug 94 and platform. The plate 62 is shifted within the opening 96 bringing the inserted arm 66 into abutting engagement with the depending wall 98 of the lug. In this position, the free arm on the plate 62 will clear the leg 95 of the lug and can be tilted upwardly and the arm 66 introduced to the opposite opening. In the event that the free arm does not clear the lug, the arm can be deformed sufficiently toward the seated arm to provide clearance. With the arm assuming its original position, escape of the arms from the openings 96 will be prohibited. With the described arrangement, the plate 62 can be easily mounted by a person on an assembly line. The assembler can compress the arms between his or her fingers sufficiently to seat the arms within the lugs.

The arm portion 100 that is captured between the lug 94 and platform has a vertical dimension slightly less than the height of the opening 96. The plate itself is held in proper position on the underside of the platform by the action of the lugs and arms fitting together, although the fit is sufficiently loose as to prevent any binding of the plate or prevention of the plate seeking a direct line of force transmittal between the cover plate and the lever system. This affords sufficient freedom of the arms 66 within the lug 94 to allow floating movement of the nose 72 within the dimple 77. Consequently, the plate 62 will float to accommodate sufficient inclinations of the platform with respect to the base, the significance of which is explained below. The tabs 68 may bear on the underside of the platform outwardly from the corner structure 86 to afford stability to the plate 62 against excessive pivoting in the direction of the tabs.

With the cover separated and tilted, the plate 62, which is the plate suspended freely therefrom, may tend to shift lengthwise of the arms and towards the center of the cover. The downturned free end 67 of the arms abuts the lugs to confine lengthwise shifting of the plate 62 and prevent detachment of the plate 62 from the cover. After assembly, the plate tends to center itself due to the cooperation of the recess 88 at the top and the relatively pointed upper end of the force-transmitting plate.

With the plates 62 in position, the knife edge 80 on each of the plates 62 will align transversely with the respective levers 18,20,22,24. The levers (18,20),(22,24) have a V-shaped portion 102, respectively adjacent their forward and rear ends. With this configuration, an upwardly opening notch 104 is defined which receives knife edge 80 on the plate 62. The force applied to the platform is distributed on the four corner plates 62 and through the coinciding knife edges 80 and levers 18,20,22,24. The floating engagement of the plates 62 and platform assures proper alignment of the knife edges 80 within the notches 104 to provide accurate weight measurement regardless of the evenness of the weight application on the platform 13.

The assembly of the scale is such that the levers and readout mechanism are in the base and the cover contains the four corner post assemblies. Simple placement of the cover over the base allows each of the post assemblies to center themselves properly upon the levers. While held in this position, retaining springs 105 depending from the cover are fastened over formed metal straps in the base to hold the cover and base assembled. The springs 105 maintain the assembly even though the scale might be picked up by its cover alone. The pressure of the tension in the springs 105 may act as if there was some weight on the platform so that the "0" adjustment is generally then utilized to bring the dial to an indicated "0" position so that the scale appears to have no weight thereon.

The foregoing description was made for purposes of clarifying the operation of the invention, with no unnecessary limitations to be derived therefrom. The scope of the invention is to be ascertained from the appended claims.

We claim:

1. In a platform-type scale comprising a base, a plurality of counterbalanced levers supported on the base, a weight-sensing mechanism operatively engaged with and responsive to movement of the levers, a cover with an upper platform mating with and shiftable vertically relative to said base, said cover depressing under an applied weight to pivot the levers which in turn actuate the weight-sensing mechanism to indicate the magnitude of the applied weight, the improvement comprising a floating corner bearing assembly associated with the cover for distributing a force imparted on said cover to said levers, said corner bearing assembly comprising:

a downwardly facing dimple formed integrally with said platform adjacent the end of each said lever, each said dimple having tapered walls extending away from an apex;

a bearing member having a rounded nose disposed within said dimple and a downwardly facing knife edge disposed transversely of the longitudinal extent of and engageable with said levers, said rounded nose being guided by said tapered walls consistently into alignment with said apex;

at least one arm extending from said bearing member; and means associated with said cover and loosely engaging said arm and retaining said bearing member upon said cover in a generally upright position relative to the cover platform and said nose within said dimple for floating movement of said bearing member relative to said cover such that said knife edge aligns relative to said levers under an unevenly applied weight on said cover to afford accurate weight readings, said engaging means providing non-binding support of the assembly to the cover.

2. The improved scale of claim 1 wherein said bearing member has a vertically disposed body and said arm extends from and is disposed transversely of said body, said platform having a lug extending downwardly from said platform and capturing said arm to retain said member upon said cover.

3. The improved scale of claim 1 wherein said bearing member comprises a flat body residing substantially in a single plane with the rounded nose adjacent the upper region of said body and at least two hook-shaped arms extend from and transversely to the plane of said body, said platform having at least two lugs, each said lug loosely receiving one of said arms to retain said member upon said platform.

4. In a platform-type scale comprising a base, a plurality of counterbalanced levers supported on the base, a weight-sensing mechanism operatively engaged with and responsive to movement of the levers, a cover with an upper platform mating with and shiftable vertically relative to said base, said cover depressing under an applied weight to pivot the levers which in turn actuate the weight-sensing mechanism to indicate the magnitude of the applied weight, the improvement comprising a floating corner bearing assembly associated with the cover for distributing force imparted on said cover evenly over said levers, said corner bearing assembly comprising:
  an annular depression within said platform and defining a downwardly facing dimple having tapered walls extending away from an apex and a substantially horizontal, annular bottom edge;
  a bearing member having a rounded nose disposed within said dimple and upwardly facing first and second edges extending away from said rounded nose sufficiently to span the radius of said bottom edge and a downwardly facing knife edge seating upon and transverse to said levers, said nose being guided by said tapered walls to a point adjacent said apex;
  at least one arm extending from said bearing member; and
  means loosely engaging said arm and floatingly retaining said bearing member upon said cover for floating movement of said bearing member about said rounded nose and relative to said cover, said first and second edges abutting said annular bottom edge with said member tilted from a vertical position, said floating movement assuring alignment of said knife edge with said levers in the event an uneven load is applied to the cover.

5. The improved scale of claim 4 wherein said platform has at least one lug with a horizontal opening and said member had a hook-shaped arm which is received in said opening, said opening having a dimension greater than said arm such that said arm is freely movable within said opening to permit said floating movement of said bearing member.

6. The improved scale of claim 4 wherein said first and second edges define a substantially straight line and said means comprise at least one arm extending from said bearing member and transversely to the line defined by said edges, said platform having at least one lug with an opening facing substantially in the direction of said depression, said opening having a dimension greater than a portion of the arm received therein which allows for the floating movement of said bearing member.

7. The improved scale of claim 4 wherein said bearing member has a substantially flat, vertically disposed body and said means comprise a plurality of spaced, hook-shaped arms extending from and transversely to the plane of said body and a plurality of lugs depending from said platform, said arms engaging with said lugs to maintain the bearing member captive on the underside of the platform.

8. The improved scale of claim 7 wherein said lugs define an opening beneath said platform and said arms are retained within said openings, said bearing member securable with the underside of said platform without the use of tools or fasteners.

9. The improved scale of claim 7 wherein said hook-shaped arms are substantially flat and integrally constructed with said body, such that said bearing member can be formed from a flat deformable blank with said arms formed by folding a portion of said blank relative to said body.

* * * * *